United States Patent
Uceda-Sosa et al.

(10) Patent No.: US 6,681,225 B1
(45) Date of Patent: Jan. 20, 2004

(54) METHOD, SYSTEM AND PROGRAM PRODUCTS FOR CONCURRENT WRITE ACCESS TO A GLOBAL DATA REPOSITORY

(75) Inventors: Rosario A. Uceda-Sosa, Hartsdale, NY (US); Steven R. Champagne, Poughkeepsie, NY (US); Kailash N. Marthi, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 09/584,523

(22) Filed: May 31, 2000

(51) Int. Cl.$^7$ .................................................. G06F 7/00
(52) U.S. Cl. .......................... 707/8; 707/10; 707/201; 709/204
(58) Field of Search ................................ 707/8, 103 R, 707/10, 201; 709/204

(56) References Cited

U.S. PATENT DOCUMENTS

| | | | |
|---|---|---|---|
| 5,333,316 A | | 7/1994 | Champagne et al. ........ 707/201 |
| 5,355,477 A | | 10/1994 | Strickland et al. ............. 707/8 |
| 5,410,697 A | | 4/1995 | Baird et al. ................... 710/200 |
| 5,623,659 A | | 4/1997 | Shi et al. ......................... 707/8 |
| 5,692,178 A | | 11/1997 | Shaughnessy .................. 707/8 |
| 5,721,943 A | | 2/1998 | Johnson ........................... 707/8 |
| 5,740,448 A | | 4/1998 | Gentry et al. ................. 370/471 |
| 5,742,813 A | * | 4/1998 | Kavanagh et al. ............. 706/50 |
| 5,794,241 A | * | 8/1998 | Loaiza ............................ 707/8 |
| 5,835,906 A | | 11/1998 | Hagersten et al. .............. 707/1 |
| 5,838,965 A | * | 11/1998 | Kavanagh et al. ...... 707/103 R |
| 5,913,213 A | * | 6/1999 | Wikstrom et al. .............. 707/8 |
| 5,920,872 A | * | 7/1999 | Grewell et al. .............. 707/202 |
| 5,933,825 A | | 8/1999 | McClaughry et al. ........ 707/200 |
| 5,983,225 A | * | 11/1999 | Anfindsen ....................... 707/8 |
| 6,012,059 A | * | 1/2000 | Neimat et al. ................... 707/8 |
| 6,085,198 A | * | 7/2000 | Skinner et al. ............. 707/101 |
| 6,112,209 A | * | 8/2000 | Gusack ........................ 707/101 |
| 6,115,703 A | * | 9/2000 | Bireley et al. ................. 707/2 |
| 6,119,145 A | * | 9/2000 | Ikeda et al. ..................... 707/8 |
| 6,182,115 B1 | * | 1/2001 | Cuomo et al. ........... 340/825.5 |
| 6,216,209 B1 | * | 4/2001 | Cadden et al. .............. 709/203 |
| 6,256,641 B1 | * | 7/2001 | Kasi et al. ...................... 707/2 |
| 6,272,491 B1 | * | 8/2001 | Chan et al. ..................... 707/8 |
| 6,304,873 B1 | * | 10/2001 | Klein et al. ..................... 707/8 |
| 6,353,828 B1 | * | 3/2002 | Ganesh et al. ................. 707/8 |
| 6,389,431 B1 | * | 5/2002 | Frolund et al. ................. 707/2 |
| 6,397,227 B1 | * | 5/2002 | Klein et al. ................. 707/200 |
| 6,446,089 B1 | * | 9/2002 | Brodersen et al. .......... 707/201 |
| 6,480,847 B1 | * | 11/2002 | Linenbach et al. ............. 707/8 |

* cited by examiner

*Primary Examiner*—Greta Robinson
*Assistant Examiner*—Miranda Le
(74) *Attorney, Agent, or Firm*—Lawrence D. Cutter, Esq.; Blanche E. Schiller, Esq.; Heslin Rothenberg Farley & Mesiti P.C.

(57) ABSTRACT

One or more tables stored in a global data repository are concurrently accessible and modifiable. A client requests the locking of one or more tables within a global server data repository on behalf of a local tree. This locking creates a lock block, which enables at least a portion of the locked tables to be selected, modified and then merged back with the tables residing in the server. One or more other clients may also request to use the same lock block and thus, the same local tree, if shared concurrency is allowed. These other clients would also be allowed to select, modify and merge at least a portion of the tables. The merging of the tables is serialized at the global data repository, if necessary.

36 Claims, 10 Drawing Sheets

METHOD, SYSTEM AND PROGRAM PRODUCTS FOR CONCURRENT WRITE ACCESS TO A GLOBAL DATA REPOSITORY

CROSS-REFERENCE TO RELATED APPLICATIONS

This application contains subject matter which is related to the subject matter of the following applications, which are assigned to the same assignee as this application and filed on the same day as this application. Each of the below listed applications is hereby incorporated herein by reference in its entirety:

"Method, System And Program Products For Efficiently Locking Resources Of A Global Data Repository," Uceda-Sosa et al., Ser. No. 09/583,797, filed May 31, 2000;

"Method, System And Progran Products For Modifying Globally Stored Tables Of A Client-Server Environment," Uceda-Sosa et al., Ser. No. 09/583,585, filed May 31, 2000; and "Method, Server And Program Products For Concurrently Accessing A Global Data Repository By Multithreaded Clients," Uceda-Sosa et al., Ser. No. 09/584,609, filed May 31, 2000.

TECHNICAL FIELD

This invention relates, in general, to a distributed computing environment, and in particular, to managing the accessing and modifying of data located in a global repository of the distributed computing environment.

BACKGROUND ART

Distributed systems are highly-available, scalable systems that are utilized in various situations, including those situations that require a high-throughput of work or continuous or nearly continuous availability of the system.

Typically, clients of a distributed system desire access to and modification of data residing in a data repository accessible by one or more servers of the system. In order to prevent corruption of the data, techniques are needed to manage the access and modification of the data.

One previous technique includes locally caching the data, so that clients have access to the data. This often results in complex and error prone data caching validation techniques, which can hinder the performance of the repository, if the data access does not follow data locality patterns.

In a further example, the data is always accessed at the server and brought over the network. This allows the user to take advantage of the search engine of the server, but there is a high performance price to be paid.

Based on the foregoing, a need still exists for a capability that facilitates efficient access and modification of data stored in data repositories.

SUMMARY OF THE INVENTION

The shortcomings of the prior art are overcome and additional advantages are provided through the provision of a method of managing access to data structures of a distributed computing environment. The method includes, for instance, obtaining, by one client application of the distributed computing environment, a plurality of independent locks for a plurality of data structures of a global data storage of the distributed computing environment, wherein the one client application comprises a plurality of independent libraries; and using, by another client application of the distributed computing environment, at least one lock of the plurality of independent locks to access at least one data structure of the plurality of data structures.

System and computer program products corresponding to the above-summarized methods are also described and claimed herein.

Advantageously, data access and modification is facilitated by an efficient and highly functional capability of the present invention.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with one or more aspects of the present invention, a plurality of client applications of a distributed computing environment can modify global tables of one or more remote servers of the distributed computing environment in a consistent, cooperative and efficient manner.

Figure 1:
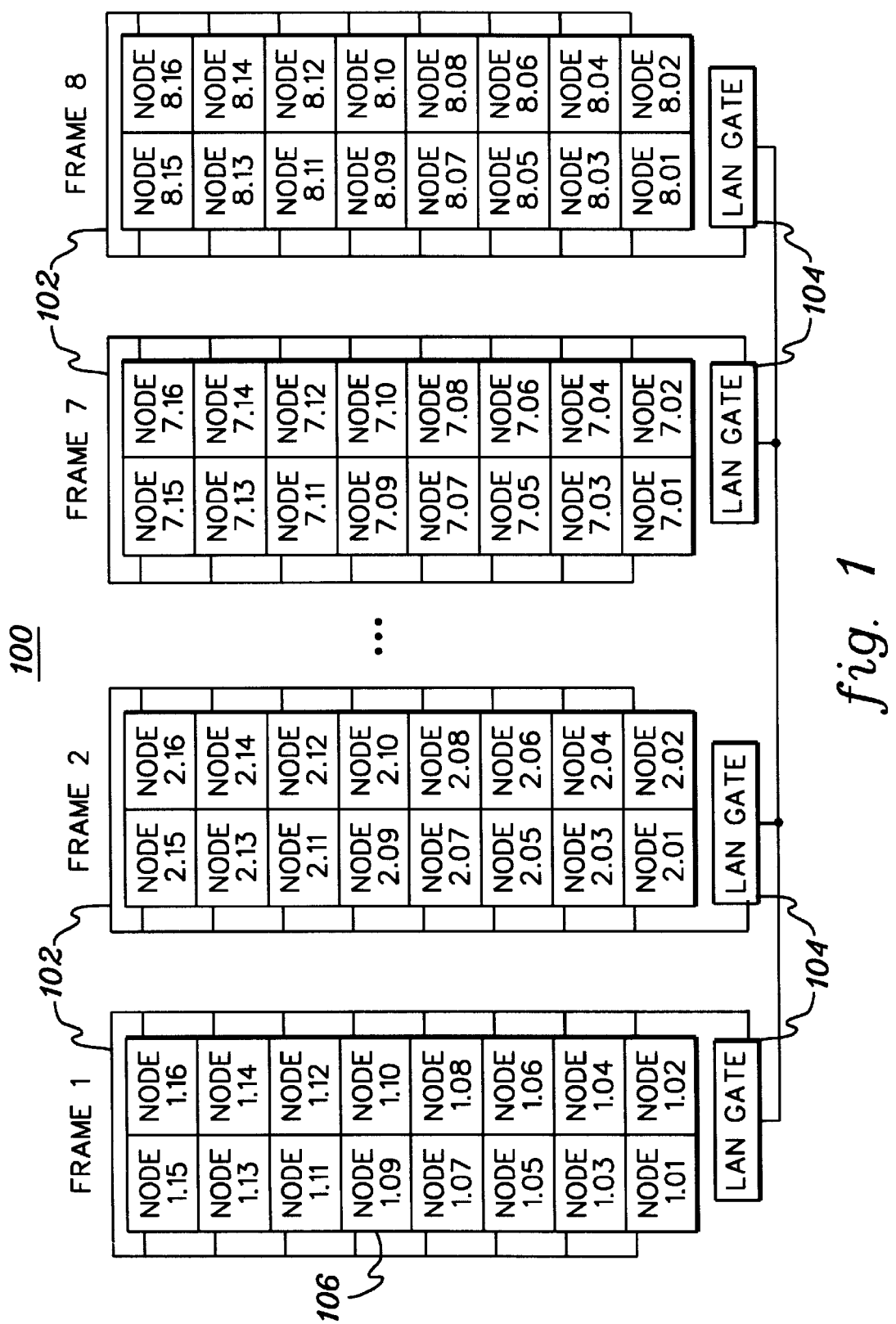
FIG. 1 depicts one example of a computing environment incorporating and using aspects of the present invention.

One example of a distributed computing environment incorporating and using aspects of the present invention is depicted in FIG. 1 and described herein. A distributed computing environment 100 includes, for instance, a plurality of frames 102, coupled to one another via a plurality of LAN gates 104. Frames 102 and LAN gates 104 are described in detail herein.

In one example, distributed computing environment 100 includes eight (8) frames, each of which includes a plurality of processing nodes 106. In one instance, each frame includes sixteen (16) processing nodes (each having one or more processors). Each processing node is, for instance, a RISC/6000 computer running AIX, a UNIX based operating system. Each processing node within a frame is coupled to the other processing nodes of the frame, via for example, an internal LAN connection. Additionally each frame is coupled to the other frames via LAN gates 104.

As examples, each LAN gate 104 includes either a RISC/6000 computer, any computer network connection to the LAN, or a network router. However, these are only examples. It would be apparent to those skilled in the relevant art that there are other types of LAN gates, and that other mechanisms can also be used to couple the frames to one another.

The distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. For example, this invention can be employed with LINUX and/or Windows operating systems. Further, a heterogeneous environment can include and utilize aspects of the invention in which one or more of the nodes and/or operating systems of the environment are distinct from other nodes or operating systems of the environment. The nodes of such a heterogeneous environment interoperate, in that they collaborate and share resources with each other. All of these variations are considered a part of the claimed invention.

Figure 2:
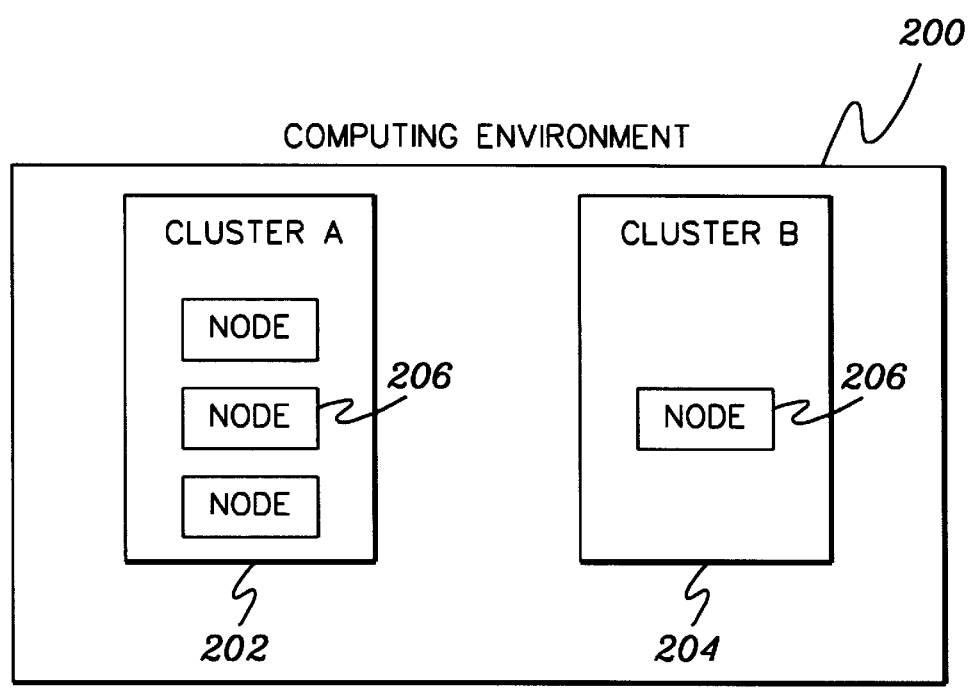
FIG. 2 depicts one embodiment of a computing environment having a plurality of clusters, used in accordance with an aspect of the present invention.

A distributed computing environment, which has the capability of sharing resources is termed a cluster. In particular, a computing environment can include one or more clusters. For example, as shown in FIG. 2, a computing environment 200 includes two clusters: Cluster A 202 and Cluster B 204. Each cluster includes one or more nodes 206, which share resources and collaborate with each other in performing system tasks. Each node includes an individual copy of the operating system.

Each cluster is managed by a cluster architecture, which includes a plurality of components (e.g., a management component, a registry component, a liveness component, a group services component and a resource management component). Each component executes one or more corresponding processes on one or more nodes of a cluster. If the component executes a plurality of processes on a plurality of nodes, then the architecture is distributed across those nodes. One example of a cluster architecture and the management of that architecture is described in detail in U.S. Patent Application entitled "Method, System And Program Products For Managing A Clustered Computing Environment," Novaes et al., Ser. No. 09/583,677, filed May 31, 2000, which is hereby incorporated herein by reference in its entirety.

Figure 3:
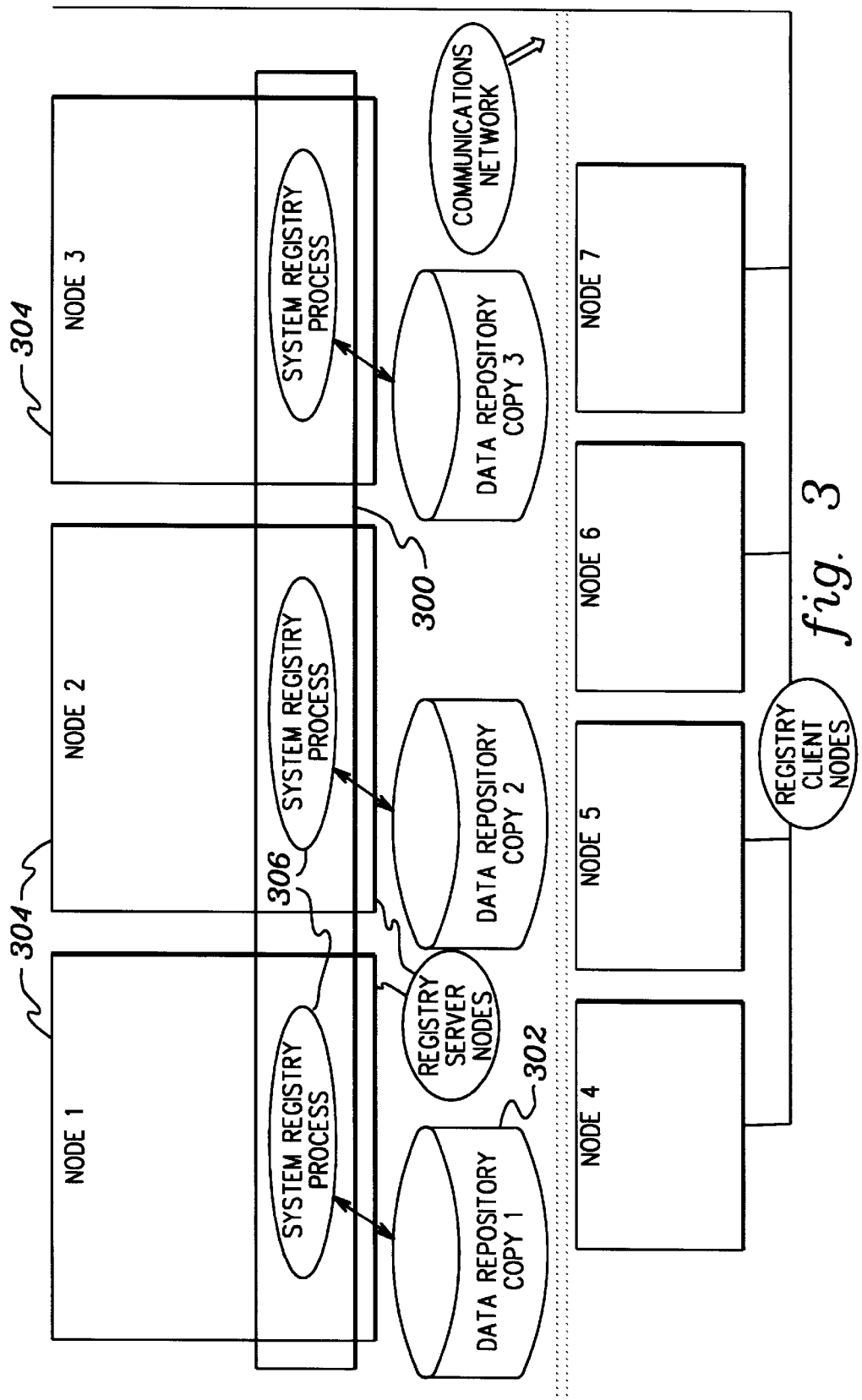
FIG. 3 depicts one embodiment of a computing environment in which a system registry component is located on only a portion of the nodes of the environment, in accordance with an aspect of the present invention.

The nodes of a cluster are capable of sharing resources and data with one another. In one embodiment, in order to facilitate the sharing of data, a system registry component 300 (FIG. 3) is used, which is highly available and provides access to at least one global data repository 302. In one example, system registry 300 is replicated among a plurality of nodes 304, as system registry processes 306. In one embodiment, however, the system registry is replicated on fewer than all of the nodes of a cluster. As shown in FIG. 3, Nodes 1, 2 and 3 include a system registry process 306, while Nodes 4–7 do not. Nodes 4–7 are thus, considered registry client nodes of a client-server environment, while Nodes 1–3 are considered registry server nodes of the environment, since the registry function is executed on those nodes.

Communication with a data repository is, for instance, connection oriented, since the existence of a session context between a client and a server aids in avoiding unnecessary network traffic.

Figure 4A:
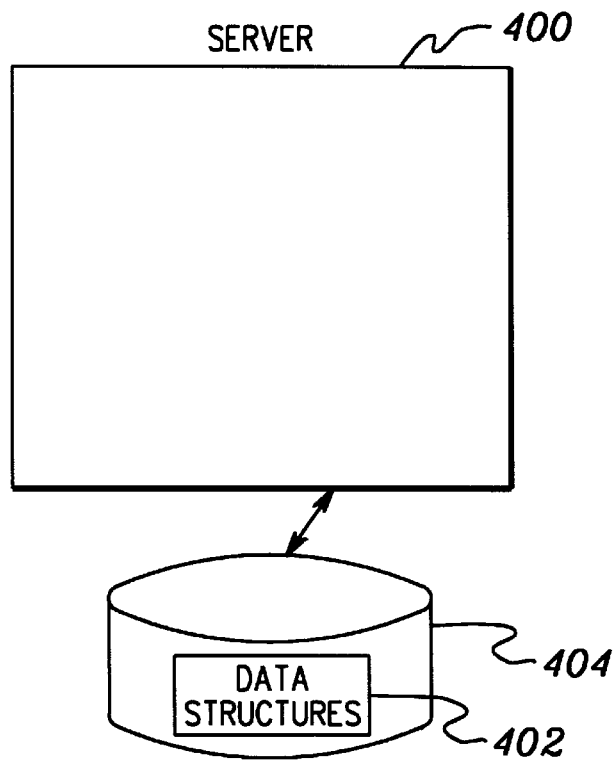
FIG. 4a depicts one example of a global data repository coupled to a server node, in accordance with an aspect of the present invention.
Figure 4B:
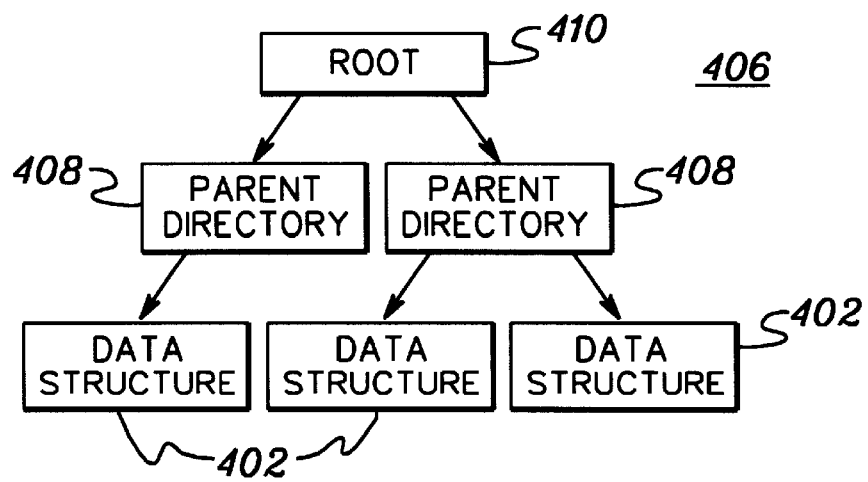
FIG. 4b depicts one example of a global tree structure used in accordance with an aspect of the present invention.

In one embodiment, a registry server node 400 (FIG. 4a) stores persistent information, such as configuration data, in one or more data structures 402 of a global data repository 404 coupled to the server. The data structures are maintained in a server data tree 406 (FIG. 4b) under parent directories 408. The topmost part of the tree is considered a root of the tree 410.

To facilitate access of the global data repository, a client application (a.k.a., a process or a user application) executing on, for instance, a client node of the client-server environment links to a Repository Client Library stored on or coupled to the client node. Further, both the clients and servers share a search and modification engine (an internal library stored on or coupled to the client and server nodes) that implements a complete set of data access services (e.g., retrieve, write, etc.). This allows a local data structure, including a local data structure that has been extracted from the server, to be manipulated via database functions, as if it was a global data structure.

Figure 5:
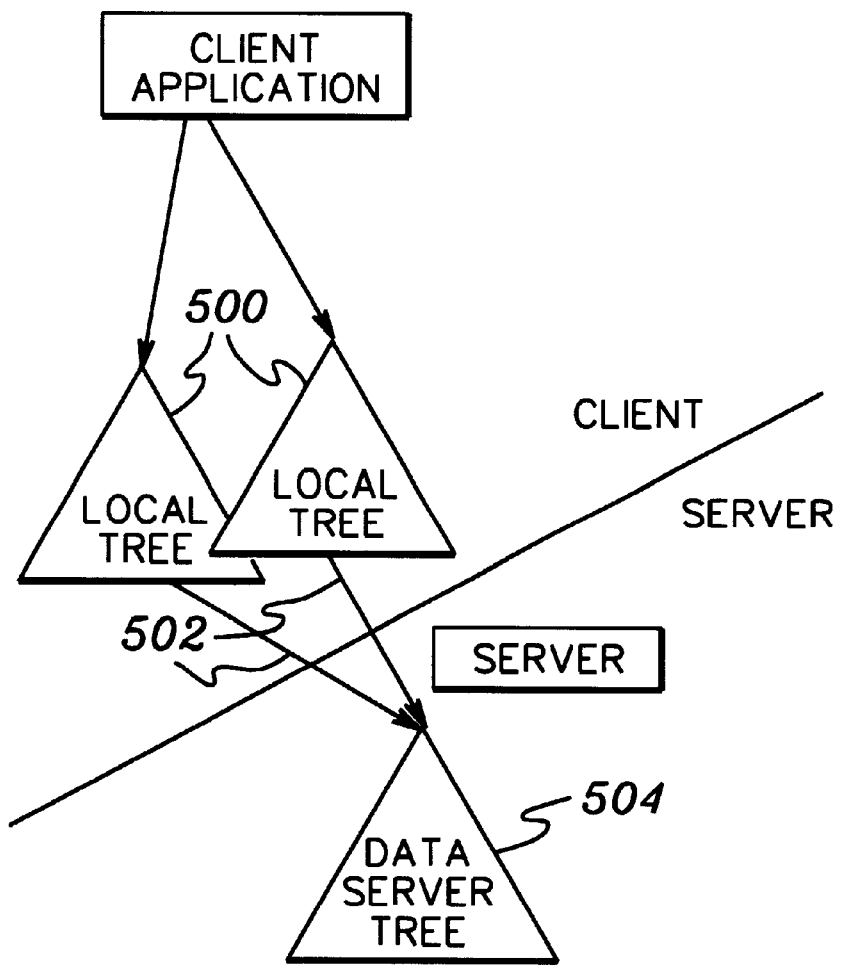
FIG. 5 depicts one example of one or more local trees being mounted to the global tree of FIG. 4b, in accordance with an aspect of the present invention.

Client applications are, for instance, multithreaded processes, possibly made up of several linked libraries (themselves multithreaded), which desire access to the data (e.g., configuration information) of one or more data repository servers. To facilitate this access, the client application (e.g., one or more threads and/or libraries) opens one or more local trees 500 (FIG. 5). In particular, the client application forwards an application programming interface (API) function requesting an Open to the Repository Client Library. The Client Library creates an empty local tree in the process and provides a root directory. It then returns to the user a handle that the user employs to populate the tree (e.g., create directories, create tables). This provides to the client application a data structure, similar to the global tree.

At this point, any operation performed on the tree is local. There is no access to the server data. In order to have access to the server data, one or more mount points 502 are provided. In particular, one or more directories of the local trees are designated as mount points. Any directory that acts as a mount point is identified with (or acts as a proxy for) the root of the global data server tree 504 to be accessed. This way, the user can access local trees, as if they were remote.

Figure 6A:
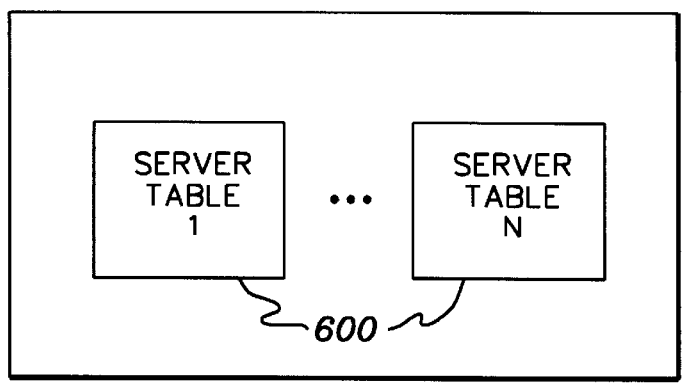
FIG. 6a depicts one embodiment of a data repository, in accordance with an aspect of the present invention.
Figure 6B:
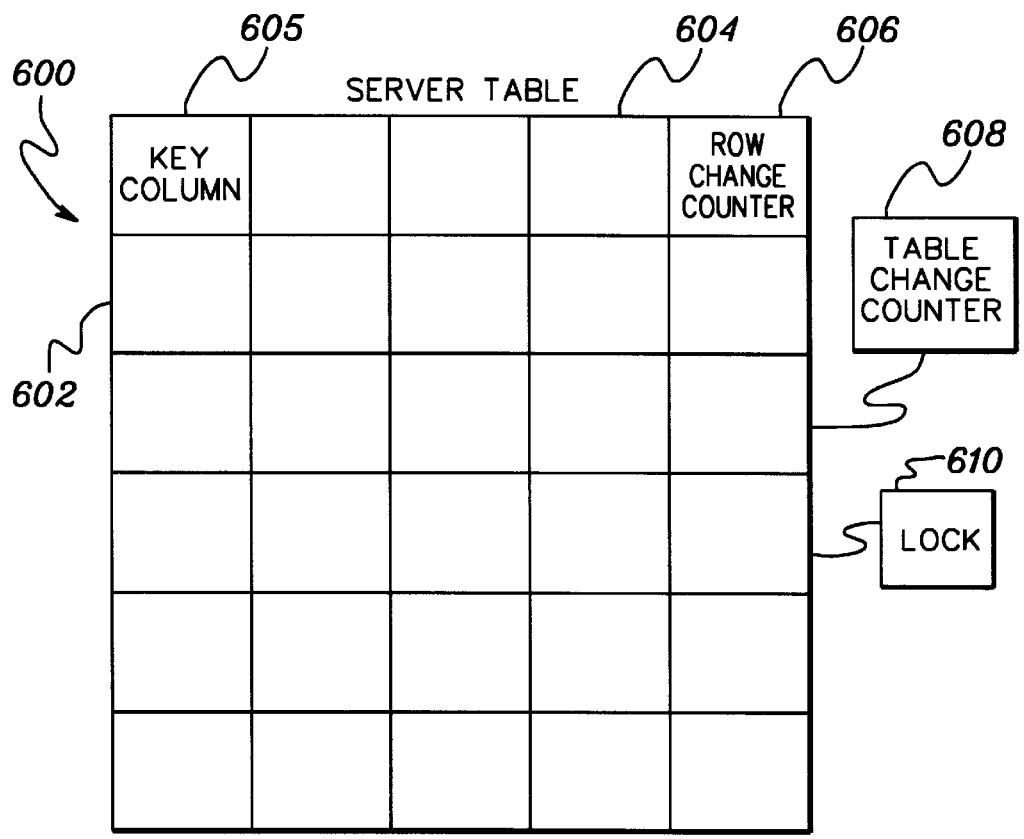
FIG. 6b depicts one embodiment of a server table of the data repository of FIG. 6a, in accordance with an aspect of the present invention.

In one example, the data repository is a relational repository, in which the data is stored in one or more data structures, such as relational tables 600 (FIG. 6a), that can be concurrently accessed in the client-server environment. Each server table includes one or more rows 602 (FIG. 6b) and one or more columns 604. The intersection between a row and a column is called a field. Typically, a column has a name and a fixed type, as well as a default value that is assigned to the column by the user when it is created. In one example, at least one of the columns is a distinguished column, whose type and name is defined by the user, and which acts as a primary key column 605. This column has no default value. Further, in accordance with an aspect of the present invention, each table has a reserved column 606, called a RowChangeCounter, that is updated at the time a row is modified. Since the RowChangeCounter is read-only, it is updated by the system (e.g., a server), and not the user. In one example, the RowChangeCounter is set equal to the value of a global counter 608, referred to as a TableChangeCounter, which is coupled to a given table and incremented each time an atomic write operation is performed against the table.

Additionally, in accordance with an aspect of the present invention, each table has a lock 610 associated therewith that controls concurrent access to its data and metadata (the definition of the table itself and its columns). The lock can be either a shared lock or an exclusive lock, as described herein. The lock indicates the degree of concurrency (one or several user allowed), but does not, in this embodiment, indicate the operations that can be run against the table.

In accordance with an aspect of the present invention, client applications (e.g., threads and/or libraries of the applications) request explicit locking of one or more tables they wish to work with. These tables are requested as a single atomic operation on a per local tree basis in order to avoid a wait-and-hold condition (one of the causes of deadlock). That is, only one outstanding request is allowed, in this embodiment, per local tree. However, there may be several local trees in a client application. Several client applications, which may or may not reside in the same node as each other or as the same node as the server, may wish to concurrently access these tables. In some cases, they request access to the tables exclusively. In some other cases, several cooperating clients (e.g., threads and/or libraries of one or more applications) are able to concurrently access a set of tables. Again, these clients may reside in different nodes, and thus, use support from the repository in order to define the cooperating groups of such tables.

It is up to the client applications to provide the semantics of the cooperation. That is, it is up to the application to determine the concurrency granularity. The repository provides lightweight and flexible primitives that permit freedom in the cooperation patterns of the client applications. In one embodiment, this effective lightweight mechanism to support cooperation patterns by the client applications is facilitated by implementing exclusive and shared locks per table, complemented with operations that bind copies of a table and synchronize them at the server as atomic operations, as described in detail below.

In one embodiment, an application programming interface function (API) is provided that allows a client (e.g., a client application or a thread of a client application) to lock one or more tables of a global data repository on behalf of a local tree. The client application (in particular, any element of the client application (e.g., a thread, a library) that has the handle to the local tree) requests all the desired tables in advance, as a single atomic operation, in order to avoid the wait-and-hold condition. A client can also add itself to a pre-existing lock via a useLock function, as described herein.

One example of pseudo-code representing a lock function is as follows: lockId lockTables(char* exclusiveTables[ ], char* sharedTables[ ]). This function requests the locking of the tables identified in the exclusiveTable and sharedTable parameters. The exclusiveTables and sharedTables arrays are made up of table names. The arrays are null terminated and could be empty. This operation has all-or-nothing and blocking semantics. If the operation succeeds, all the tables are reserved for the user requesting the lock, either in exclusive or shared fashion. If the operation fails, none of the tables are reserved.

Should a table be reserved exclusively by a client, no other client can obtain a lock on it. If a table is reserved as shared, other clients can obtain a shared lock, thus establishing a group of cooperating clients for that table or set of tables. All the tables locked by the client are said to be in a lock set of that client. If successful, the return value (lockId) is a lock identifier that the client uses in order to identify the lock set. In particular, the lockId is assigned, by the client, to a local tree that includes the one or more tables of the lock set.

Once the lockTables operation has been successfully issued, the client is within a runtime scope of the lock set called a lock block. Within a lock block, no further calls to lockTables are allowed and no other global tables can be accessed by the client for that local tree (again, to avoid the wait-and-hold condition). However, the client can issue other lockTables functions for other tables to be associated with one or more other local trees.

The Repository Client Library, which is in charge of routing requests to the appropriate repository server, keeps track of the lock block on behalf of the client, so that any repository operation within its runtime scope does not need to explicitly reference the lockId.

One or more other clients can share a lock block obtained by another client. In order to obtain a shared lock block, a function is used having for instance, the following format: returnvalue useLock(lockId existingLockId, treeHandleType treeHandle), in which the existing lockId specifies the lock to be shared, and treeHandle specifies the handle of the local tree associated with the lockId. This function allows a client application to create the same lock block as another client application, which may or may not be residing in the same node. Further, a thread of one client application can create the same lock block as a thread of the same or another client application. This is because the threads are not necessarily aware of each other. Thus, the locked tables associated with the lockId and a particular local tree are effectively accessible from the current lock block. The operation succeeds when the parameter lockId is already created. Any number of cooperating clients can share a lock block.

Once a lock block is obtained, each client can then perform operations against the reserved tables in the server data repository, following the Remote Service Model. That is, each write/read operation is executed in the server and the results are brought back to the client. Each write operation is atomic by keeping a shadow of the table on which the modifications are made. Once the modifications are carried out, the shadow copy is declared the current version of the table. This atomic swap of tables is described in detail in U.S. Patent Application entitled "Method, System And Program Products For Modifying Globally Stored Tables Of A Client-Server Environment," Uceda-Sosa et al., Ser. No. 09/583,585, which is hereby incorporated herein by reference in it entirety.

Even though the Remote Service Model can easily be implemented, it has inefficiencies, since it involves network traffic in each write and read operation. Since the data repository is to support flexible granularity in the number of clients that access the tables and on the set of operations that each client should be carrying out atomically, in this example, some explicit caching and transaction techniques are necessary in order to implement a truly flexible cooperating scheme. However, traditional transactions are not very user friendly, since they usually include a task list of the write operations to be carried out in the server. Thus, in accordance with an aspect of the present invention, a smart caching facility is provided, which uses the same data representation as the underlying data repository, which the user can query using the same facilities as querying a table. That is, the operations of a transaction can be batched in special local tables.

In support of the smart caching facility of the present invention, functions are provided which allow a copy of a previously locked table to be brought into the client by attaching it to the lock block, and then synchronizing it at the server, as an atomic operation.

In one example, a copy of a previously locked table (or a portion of the table) is attached to the lock block using a select function. This function creates a temporary table in the client with a set of the rows and columns selected from of the input table of the server. As one example, this function includes the following semantics: TableIdentifier select (char* inputTable, char* projectioncriteria[ ], char* selectionCriteria, void* selectionParameters[ ]), in which the input table is one of the tables belonging to the lock set; the projectionCriteria parameter is an array of column names to be extracted from the input table; and the selectionCriteria parameter is a string that describes the criteria that a row is to satisfy in order to be selected. There are several grammars that can be used for this selection.

In one example, boolean logic has been implemented on predicates of the form "ColumnName OP Value", where the OP is in the set <>, >=, >=, ==, and !=; and Value is an element in the type range of the column (for example, columns could be integral types, pointers and strings). Furthermore, the Value parameter of the predicates in the selection string can be passed as place holder variables to be substituted by the members of the selectionParameters array in the "printf" parameter list fashion. This grammar can be augmented with regular expressions to support more sophisticated querying capabilities. Thus, sufficient querying capabilities are provided to extract an arbitrary number of rows and columns from the input table to create a new temporary client table.

Figure 7:
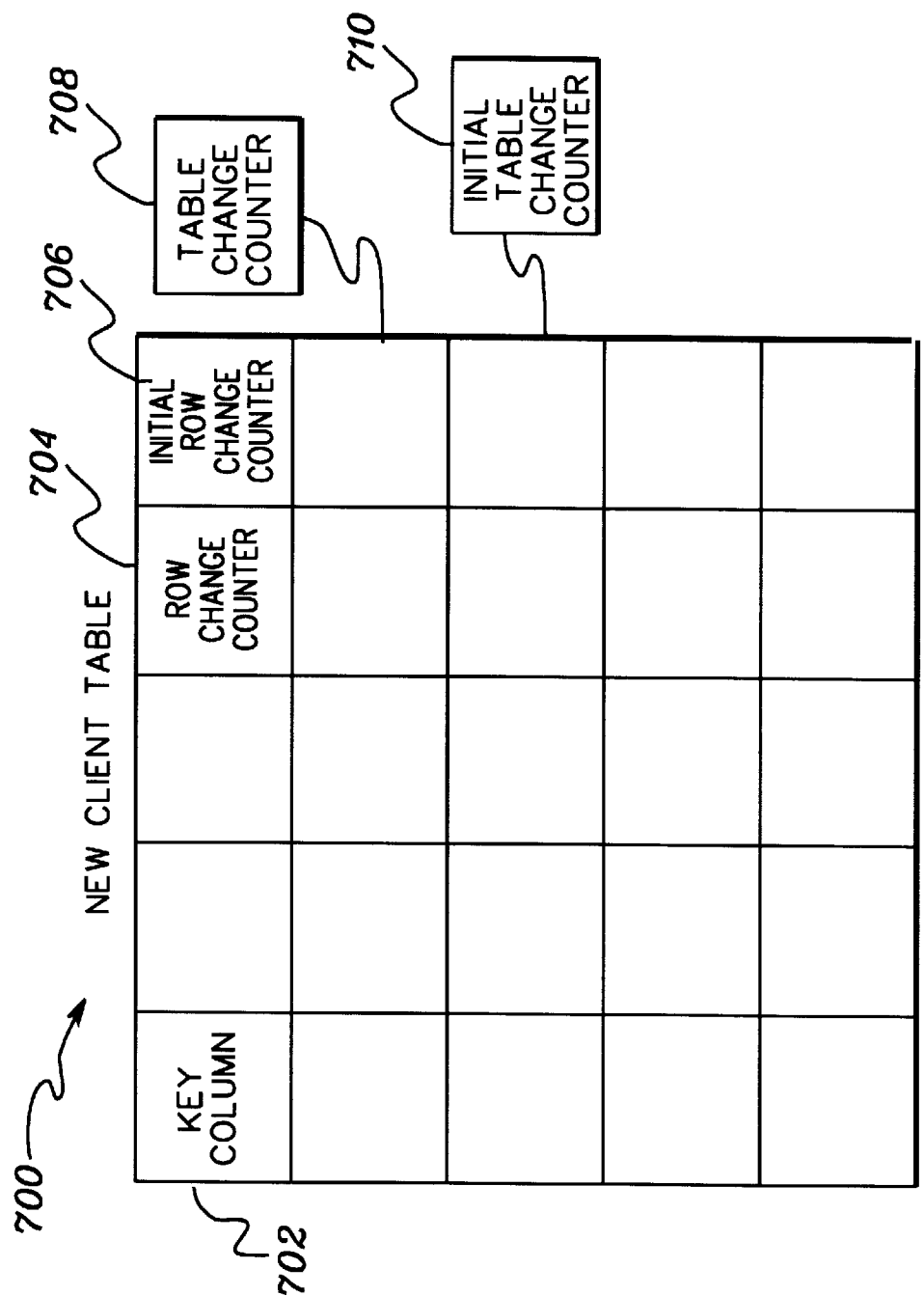
FIG. 7 depicts one example of a temporary client table, in accordance with an aspect of the present invention.

One example of this new table is described with reference to FIG. 7. A table 700, which is accessed by its TableIdentifier, includes one or more rows and columns. For instance, it includes a key column 702 and a RowChangeCounter column 704 of the input table (with the same values). It also includes a third distinguished column, an InitialRowChangeCounter 706, which is read-only (thus, initialized at the server), and whose values are those of the current TableChangeCounter 708. TableChangeCounter 708 is that of the original table. It also has a second table-wide counter, an InitialTableChangeCounter 710, which is initially set with the same value as the TableChangeCounter. Further, the table includes any other selected columns.

This temporary table is attached to the lock block. It resides locally and it can be efficiently written and read by the client. When a row is written, its TableChangeCounter and its RowChangeCounter values are updated, as indicated above. The InitialRowChangeCounter and the InitialTableChangeCounter values remain the same.

If a row is added to the temporary table, its InitialRowChangeCounter is initialized to 0, and its RowChangeCounter is updated as usual. If a row is deleted, it is marked as deleted, but is still kept around to be able to delete it in the server, as described below. Its RowChangeCounter is updated to reflect the value of the TableChangeCounter at the point at which it was deleted.

When several temporary table fields have been updated, the user may choose to update a set of server tables, as an atomic operation. One example of an API function employed for this task is described below: returnValue merge(TableIdentifier temporaryTables[ ], int refresh), in which TableIdentifier temporaryTables[ ] indicates the one or more tables to be merged with the one or more server tables; and refresh indicates whether a refresh operation is being requested.

Figure 8:
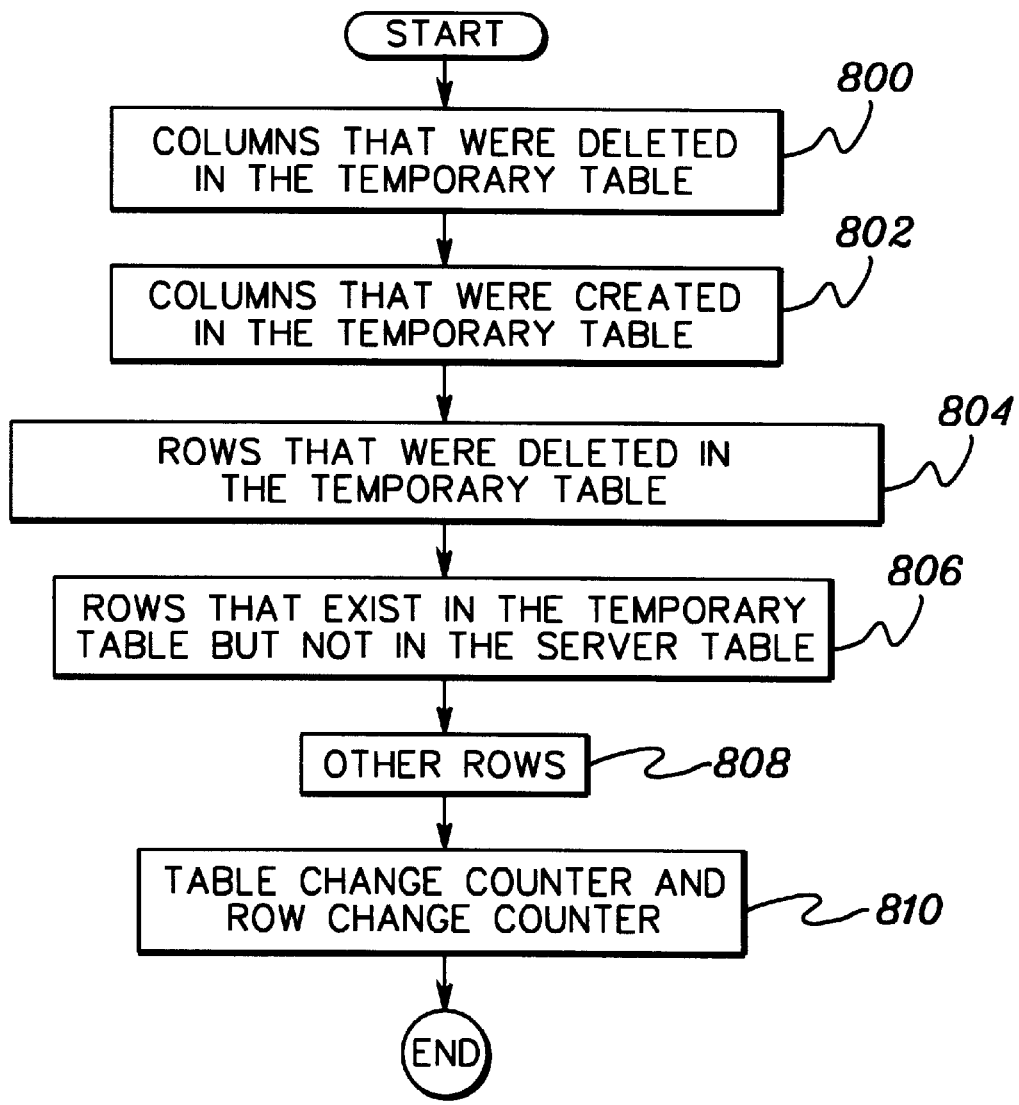
FIG. 8 depicts one embodiment of the logic used to merge one table with another table, in accordance with an aspect of the present invention.

The merge function is substantially equivalent to a commit transaction for a set of input tables. The tables to be merged are obtained with a legal select invocation within a lock block, as indicated above. This function updates the tables in the global repository, as an atomic operation, as described with reference to FIG. 8. The steps described with reference to FIG. 8 are performed for each table. In one embodiment, these steps are followed in the order described herein.

Referring to FIG. 8, initially, the names and types of the columns that were deleted in the temporary client table (which are kept track of by the Client Repository Library) are shipped back to the server as part of the metadata of the table, STEP 800. Any server table column that has the same type and name is deleted, as long as the RowChangeCounter column of the server table has values no higher than those in the InitialRowChangeCounter column passed to the server. This is a synchronization check in case the table was altered by other users. Note that it is possible that a column is created and deleted and recreated again several times. In this case, only the last deletion is kept in the list.

Next, new columns that were created in the temporary table are handled, STEP 802. The new columns are added to the server table, while checking for existing columns with the same name, (since not all the columns may have been extracted or another user may have added other columns to the global table in the meantime). If a column with the same name, but different type exists in the server table, an error is returned and the merge operation ends.

As for rows, in one embodiment, the rows that are updated are those where the InitialRowChangeCounter is less than the RowChangeCounter. This includes the rows that have been deleted.

For rows that were deleted in the temporary client table, their keys are kept in a list associated with the source table together with their InitialRowChangeCounter value, STEP 804. The server table is scanned for these keys. If the keys are found and their RowChangeCounter values are the same as those recorded in the list, the rows are deleted. Otherwise, the rows are kept. This is a synchronization check in case the table was altered by other users. Note that it is possible that a row is created and deleted and recreated again several times. In this case, only the last deletion is kept in the list.

Each row that exists in the temporary table, but not in the server table, is added to the server table, STEP 806. Default values are used for the fields of columns that exist in the server table, but not in the temporary table.

The remaining rows in the temporary client table are scanned, comparing each field with the corresponding ones in the server table, STEP 808. When a difference is encountered, the value of the field in the temporary table replaces the value in the server table.

The values of the TableChangeCounter and RowChangeCounter in the temporary client table are ignored, STEP 810.

In the server table, the TableChangeCounter is incremented by 1, if there are any changes to be reflected. The RowChangeCounter field for any rows added or modified is set equal to the TableChangeCounter of the server table.

Subsequent to performing the write operation, the temporary table is rebuilt with the new values, following the same selection criteria as originally issued (the selection criteria is a string that is kept as part of the metadata of the temporary table), provided that a refresh parameter is set to a non-zero value. The refreshed table is sent back to the client in this case.

In the above merge operation, the tables are modified as an atomic operation. This is accomplished by employing a shadow copy of the server table, where the modifications are made, as described in U.S. Patent Application entitled "Method, System And Program Products For Modifying Globally Stored Tables Of A Client-Server Environment," Uceda-Sosa et al., Ser. No. 09/583,585, which is hereby incorporated herein by reference in it entirety.

Additionally, the server Repository Topology is kept itself as a table. That is, the list of all the tables (and directories) is kept in an internal table, called the Topology Table. This table works as any other server table in the repository. Hence, it also has a shadow copy. When the shadow copy of each table is updated, so is the shadow copy of the Topology Table. The atomicity of the operation comes from the swap of the shadow copy of the Topology Table itself and its synchronization with the persistent files. (Again, one example of the swap is described in U.S. Patent Application entitled "Method, System And Program Products For Modifying Globally Stored Tables Of A Client-Server Environment," Uceda-Sosa et al., Ser. No. 09/583,585, which is hereby incorporated herein by reference in it entirety.)

In one embodiment, the merges are serialized in the server, if necessary. Further, to constrain network traffic, only the rows where the InitialRowChangeCounter is less than the RowChangeCounter are sent from the client, since these are the only rows affected. However, once the server tables have been modified, the select operation is reissued and the tables are refreshed in the client. In one example, all of the rows are transmitted back to the client, since the tables may reflect modifications from other cooperative clients.

The benefit of this pair of functions (i.e., select and merge) in the context of a lock set comes from its flexibility of use. Since most data repositories are designed to provide read performance at the cost of write operations, special mechanisms are arbitrated in order to accommodate high write loads, like in the case of the boot of a big cluster, where resources are harvested and the configuration tables are to be updated quickly. The facility described herein provides performance savings and flexibility by allowing concurrent write in the context of lock acquisition. Furthermore, the mechanism takes into account the fact that each client application may be made up of several linked libraries, which might need to access data in separate lock blocks.

One example of the use of the select and merge functions inside of a lock block is further described with reference to FIGS. 9 and 10. In particular, FIG. 9 depicts one embodiment of the logic used to select one or more tables and to perform a merge of the one or more tables within a lock block; and FIG. 10 is a graphical illustration of the select and merge within a lock block.

Figure 9:
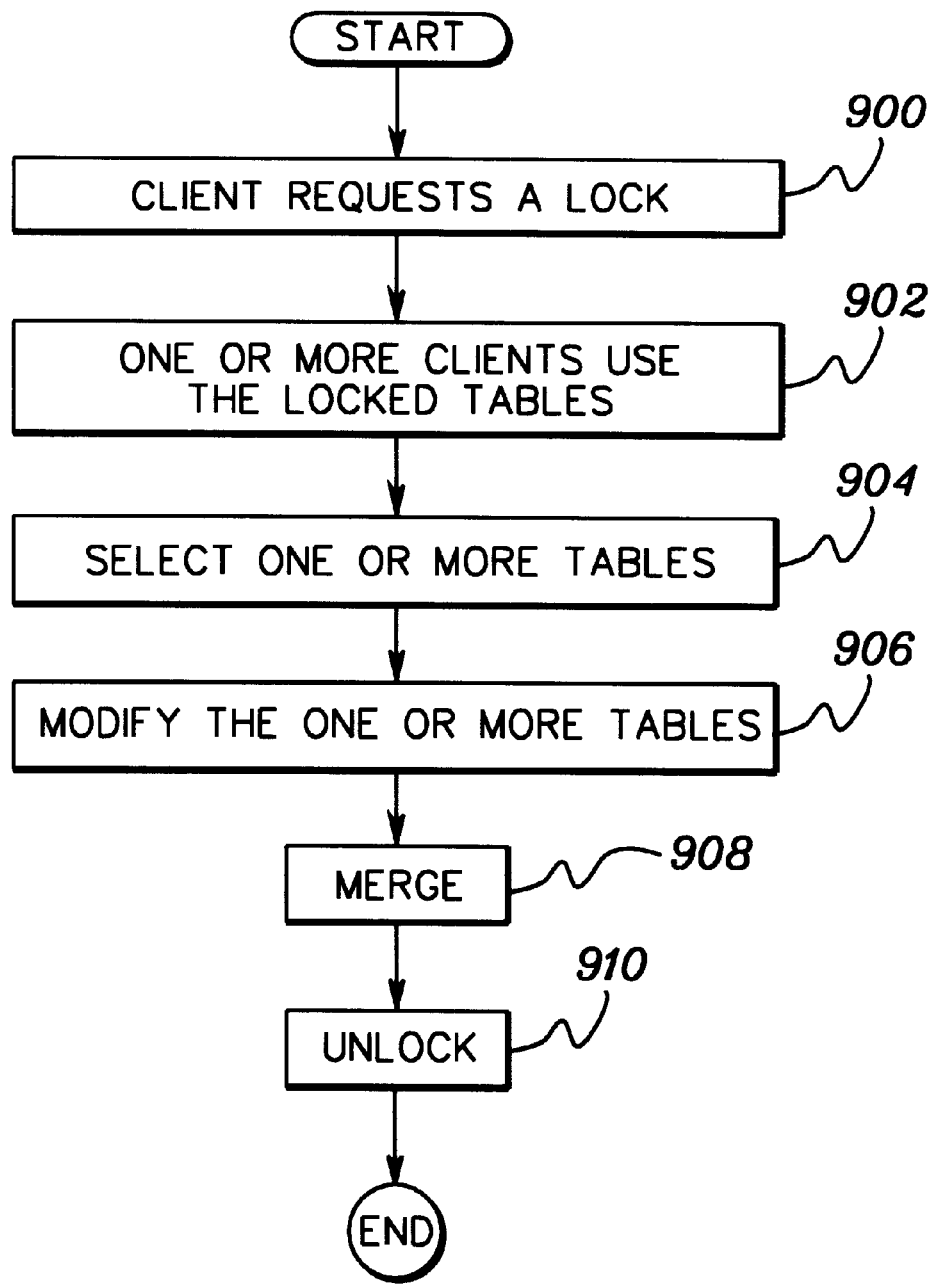
FIG. 9 depicts one embodiment of the logic used to select and modify table(s) within a lock block, in accordance with an aspect of the present invention.
Figure 10:
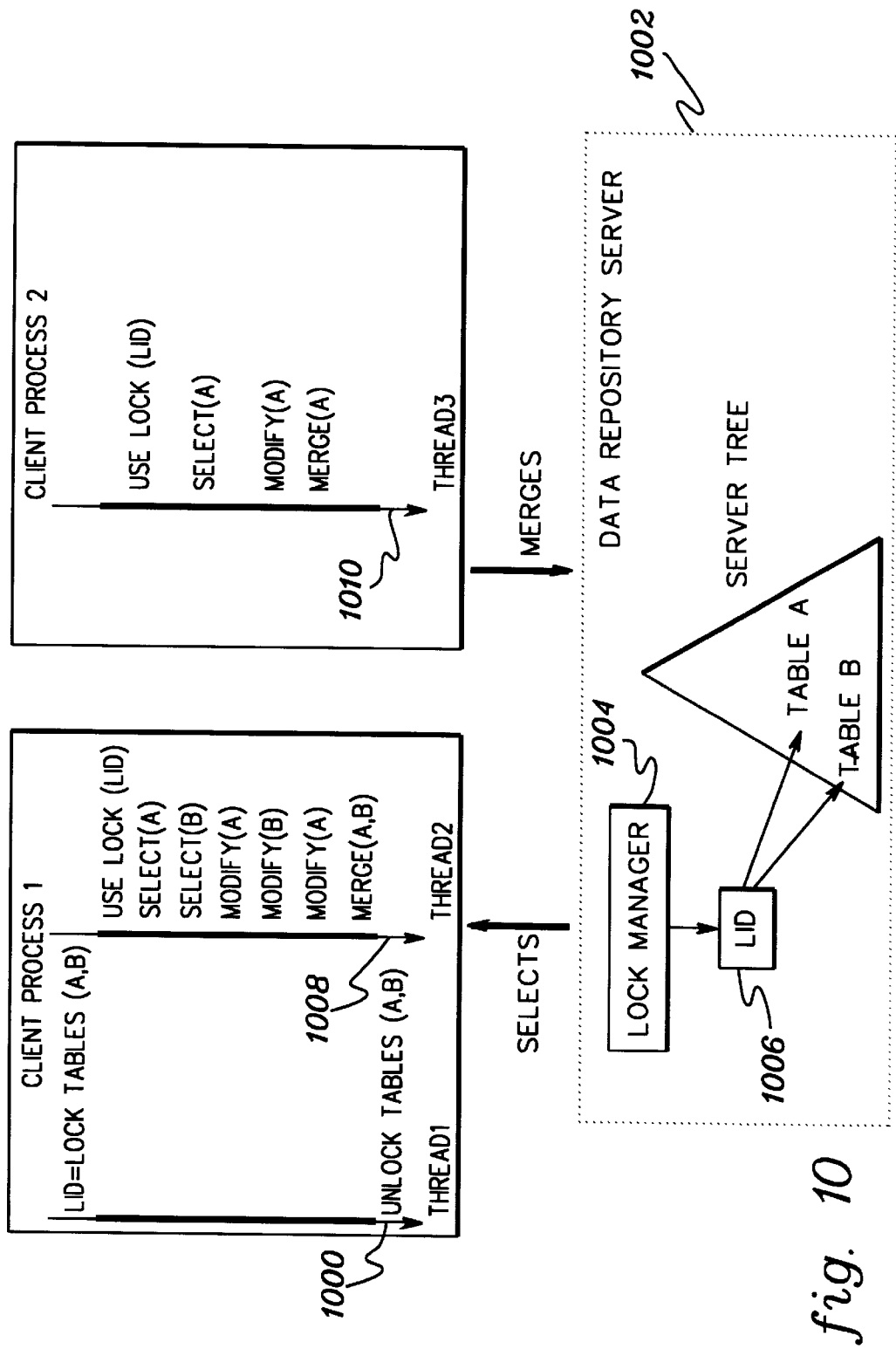
FIG. 10 depicts a graphical representation of using the select and merge functions within a lock block, in accordance with an aspect of the present invention.

Referring to FIG. 9, in one embodiment, a client requests a lock of one or more tables, STEP 900. For example, a thread (1000, FIG. 10) of a client application, such as a Client Process 1, issues a lockId function in order to lock Table A and Table B, in this example. The lock function is performed, for instance, by a server 1002 associated with the tables to be locked. As a result of performing the lock, a lock manager 1004 issues a lock identifier 1006 that is the identifier assigned to the lock set of Table A and Table B. (In other words, it is assigned to the local tree, which includes Tables A and B). The lockId is forwarded to the client.

Subsequent to obtaining a lock by one client, the same client and/or one or more other clients can use the same lockId and thus, the same locked tables, STEP 902 (FIG. 9), via, for instance, issuing the useLock function and providing the lockId and the handle of the local tree. For example, another thread 1008 of Client Process 1 can request to share the lockId (and thus, the local tree) obtained by thread 1000, and/or a thread 1010 in another client application (e.g., Client Process 2) can also request to share the lockId (and local tree). The client processes can either be executed on the same node or on different nodes.

Thereafter, a client selects one or more tables of the local tree within the scope of the lock to modify, STEP 904. For example, for each table to be modified, a client issues a select function to create a temporary table of one or more rows and columns selected from the chosen locked server table. After creating the temporary table, the client modifies one or more rows or columns of the table, STEP 906.

Subsequently, the client issues a merge function within the scope of the lock to merge one or more modified temporary tables of the local tree with the one or more server tables, STEP 908. Since the server can receive multiple merge functions concurrently by different clients, lock manager 1004 controls any serialization of the global tables that is needed.

In addition to the above, when a client no longer wants a locked table, it can unlock it, STEP 910. In order to unlock one or more tables, an unlock table function is used. In one embodiment, the pseudo-code for this function includes: returnValue unlockTables (int lockId, char* tables[ ]), in which returnValue is an integer, in this example, indicating the success of the operation; lockId specifies the identifier of the lock set; and tables[ ] is an array specifying the one or more tables of the lock set to be unlocked.

The client is allowed to dispose of tables gradually, so that its lock set can decrease over time. If the first parameter of the tables[ ] array is an asterisk (*), then all of the tables of the local tree are released. Similar to the lock operation, the unlock operation has all-or-nothing semantics. In the case of shared lock blocks, this operation succeeds, if all the tables of the lock block are disposed of in a single atomic operation.

Once the tables fall out of the lock set (i.e., are part of an unlockTables call), their temporary tables are disposed of, and their identifiers are no longer available to the client application(s). When all of the tables of a local tree are released, the local tree can be deleted.

The sequence of events described above is only one example. One or more of the events can be eliminated or modified, and/or other events can be added without departing from the spirit of the present invention. For example, a table can be selected, but not modified; selected, but not merged; not selected or merged; merged then used again, etc.

Although in the description above tables in the global repository are locked, this is only one example. In further examples, the locking can be performed at a different granular level (e.g., a portion of a table).

By employing the above-described facilities, the user is allowed to modify the server tables directly, but also has the opportunity to batch modifications in the client and send the batched modifications to the server as a single atomic operation, while taking advantage of explicit locking. The explicit locking and transactions are integrated. Additionally, several clients can cooperate in their modifications of server tables without the need to sequentialize their lock-holding patterns as a server request operation. For instance, for two clients, Client A and Client B, their traditional write lock sequence would be:

Client A: lockTables (server request), perform operations, unlockTables (also a server request);

Client B: lockTables (server request), perform operations, unlockTables (also a server request).

Thus, four (4) server requests have to be sequentialized, with their corresponding network latencies. If Client A and Client B are actively cooperating in their modification of the shared tables, this sequentialization is very expensive. The more clients that cooperate in write operations, the more expensive this traditional technique becomes. Instead, in accordance with an aspect of the present invention, the lock requests are allowed to overlap and an internal lock mechanism is provided in the server. Since, in most cases, the rows that are modified are few, the merge operation itself can be implemented efficiently.

In addition to the above, the facility presented herein is more usable than traditional transactions for other reasons. For instance, the results of the write operations to temporary tables are immediately seen by the application. This is particularly useful when a single client itself is a sophisticated application, with cooperating threads. Further, the temporary tables work as a scratch pad that can be queried using the high-level searching capabilities of the database itself. Transaction semantics are provided across tables and can be checkpointed (by several invocations of the merge operation) seamlessly. A new select operation on a given table implicitly refreshes temporary tables already existing in the client.

Advantageously, the facilities of the present invention allow several clients to modify global tables residing in one or more global repositories in a consistent, cooperative and efficient manner. Each global repository can be remote or local to the users (and/or nodes) accessing it. Aspects of the present invention are described with relation to a data repository used for configuration data in a cluster environment, where the data is stored in tables and directories. The repository is designed to support efficient read operations to access this valuable configuration information. Although the description herein is in relation to a data repository, this is only one example. Aspects of the present invention can be used in various other situations.

The access and concurrent modification facilities described herein are advantageously provided at the application level, such that operating system kernel extensions are not needed. This allows the capabilities of the present invention to be platform independent.

While a clustered environment is provided as one example, the invention is not limited to such an environment. Further, one or more aspects of the present invention are applicable to homogeneous systems, as well as heterogeneous systems. As one example, capabilities are provided to facilitate the interoperability of the systems of a heterogeneous environment.

Aspects of the invention are applicable to client-client environments, as well as client-server environments. For example, local tables can be merged with other local tables. Likewise, global tables can be merged with other global tables.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing access to relational data structures of a distributed computing environment, said method comprising:

obtaining by one client application of said distributed computing environment, a plurality of independent locks for a plurality of relational data structure of a global data storage of said distributed computing environment, wherein said one client application comprises a plurality of independent libraries; and using, by another client application of said distributed computing environment, at least one lock of the plurality of independent locks to access at least one relational data structure of said plurality of relational data structures, wherein said plurality of independent locks is associated with at least one local tree, said at least one local tree facilitating said access by said another client application to at least one relational data structure of said plurality of relational data structures.

2. A system of managing access to relational data structures of a distributed computing environment, said system comprising:

means for obtaining, by one client application of said distributed computing environment, a plurality of independent locks for a plurality of relational data structures of a global data storage of said distributed computing environment, wherein said one client application comprises a plurality of independent libraries; and means for using, by another client application of said distributed computing environment, at least one lock of the plurality of independent locks to access at least one relational data structure of said plurality of relational data structures, wherein said plurality of independent locks is associated with at least one local tree, said at least one local tree facilitating said access by said another client application to at least one relational data structure of said plurality of relational data structures.

3. At least one program storage device readable by a machine, langibly embodying at least one program of instructions executable by the machine to preform a method of managing access to relational data structures of a distributed computing environment, said method comprising:

obtaining, by one client application of said distributed computing environment, a plurality of independent locks for a plurality of relational data structures of a global data storage of said distributed computing environment, wherein said one client application comprises a plurality of independent libraries; and using, by another client application of said distributed computing environment, at least one lock of the plurality of independent locks to access at least one relational data structure of said plurality of relational data structures, wherein said plurality of independent locks is associated with at least one local tree, said at least one local tree facilitating said access by said another client application to at least one relational data structure of said plurality of relational data structures.

4. The method of claim 1, wherein the obtaining is performed by at least one of the plurality of independent libraries.

5. The method of claim 1, wherein the client application comprises at least one thread, and wherein the obtaining is performed by the at least one thread.

6. The method of claim 1, wherein the obtaining comprises requesting by the one client application the plurality of independent locks.

7. The method of claim 6, wherein the requesting comprises atomically requesting the plurality of independent locks by the one client application.

8. The method of claim 1, wherein at least one relational data structure of the plurality of relational data structures comprises at least a portion of a relational table comprising cluster configuration data.

9. The method of claim 8, wherein the using comprises the another client application using the at least one lock to access the at least a portion of a relational table.

10. The method of claim 9, further comprising the another client modifying the at least a portion of a relational table.

11. The method of claim 10, wherein the modifying comprises the another client modifying a temporary copy of the at least a portion of a relational table.

12. The method of claim 11, wherein the modifying further comprises merging the temporary copy with the at least a portion of a relational table.

13. The method of claim 1, further comprising unlocking at least one relational data structure of the plurality of relational data structures.

14. The system of claim 2, wherein the means for obtaining comprises means for obtaining by at least one of the plurality of independent libraries.

15. The system of claim 2, wherein the one client application further comprises at least one thread, and wherein the means for obtaining comprises means for obtaining by the at least one thread.

16. The system of claim 2, wherein the means for obtaining comprises means for requesting by the one client application the plurality of independent locks.

17. The system of claim 16, wherein the means for requesting comprises means for atomically requesting the plurality of independent locks by the one client application.

18. The system of claim 2, wherein at least one relational data structure of the plurality of relational data structures comprises at least a portion of a relational table comprising cluster configuration data.

19. The system of claim 18, wherein the means for using comprises means for the another client application using the at least one lock to access the at least a portion of a relational table.

20. The system of claim 19, further comprising means for modifying by the another client the at least a portion of a relational table.

21. The system of claim 20, wherein the means for modifying comprises means for modifying by the another client a temporary copy of the at least a portion of a relational table.

22. The system of claim 21, wherein the means for modifying further comprises means for merging the temporary copy with the at least a portion of a relational table.

23. The system of claim 2, further comprising means for unlocking at least one relational data structure of the plurality of relational data structures.

24. The at least one program storage device of claim 3, wherein the obtaining is performed by at least one of the plurality of independent libraries.

25. The at least one program storage device of claim 3, wherein the client application comprises at least one thread, and wherein the obtaining is performed by the at least one thread.

26. The at least one program storage device of claim 3, wherein the obtaining comprises requesting by the one client application the plurality of independent locks.

27. The at least one program storage device of claim 26, wherein the requesting comprises atomically requesting the plurality of independent locks by the one client application.

28. The at least one program storage device of claim 3, wherein at least one relational data structure of the plurality of relational data structures comprises at least a portion of a relational table comprising cluster configuration data.

29. The at least one program storage device of claim 28, wherein the using comprises the another client application using the at least one lock to access the at least a portion of a relational table.

30. The at least one program storage device of claim 29, further comprising the another client modifying the at least a portion of a relational table.

31. The at least one program storage device of claim 30, wherein the modifying comprises the another client modifying a temporary copy of the at least a portion of a relational table.

32. The at least one program storage device of claim 31, wherein the modifying further comprises merging the temporary copy with the at least a portion of a relational table.

33. The at least one program storage device of claim 3, furthering comprising unlocking at least one relational data structure of the plurality of data structures.

34. The method of claim 1, wherein at least a portion of said plurality of relational data structures store cluster configuration data.

35. The system of claim 2, wherein at least a portion of said plurality of relational data structures store cluster configuration data.

36. The at least one program storage device of claim 3, wherein at least a portion of said plurality of relational data structures store cluster configuration data.

* * * * *